UNITED STATES PATENT OFFICE.

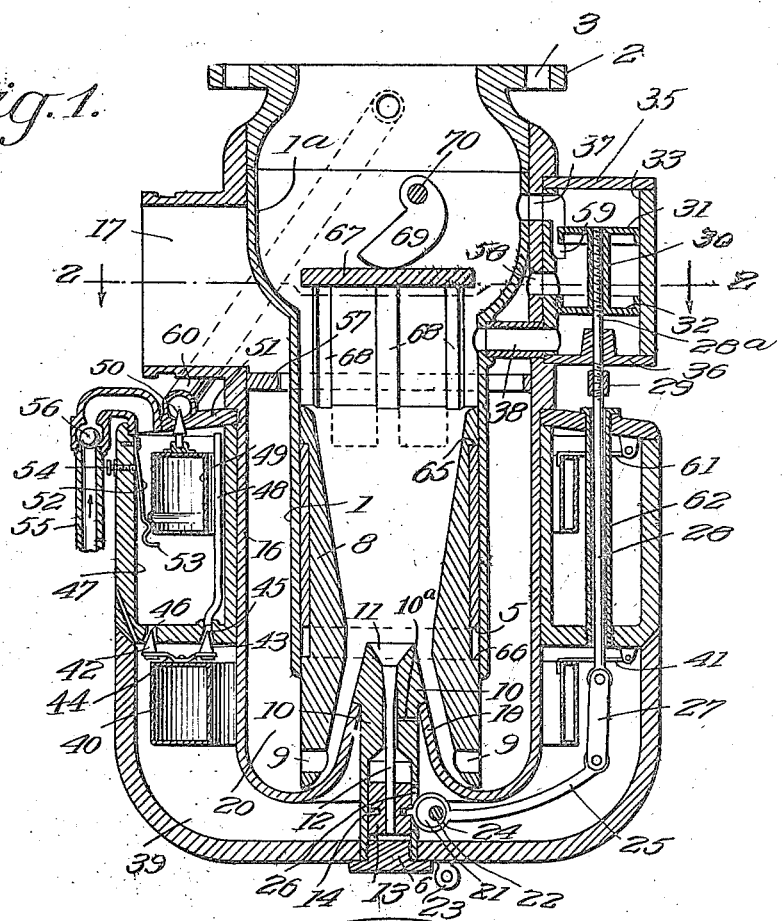

CHAUNCEY MORGAN, OF WEST MILFORD, WEST VIRGINIA.

CARBURETER.

1,234,558.  Specification of Letters Patent.  Patented July 24, 1917.

Application filed May 8, 1915.  Serial No. 26,728.

*To all whom it may concern:*

Be it known that I, CHAUNCEY MORGAN, a citizen of the United States, and a resident of West Milford, in the county of Harrison and State of West Virginia, have made certain new and useful Improvements in Carbureters, of which the following is a specification.

My invention is an improvement in vacuum carbureters and the invention has for its object to provide a carbureter of the character specified and of the "Venturi" type, wherein the carbureter consists of a main or inner casing and an outer or jacketed casing spaced apart from the inner casing and communicating with the inner casing at the lower end thereof, the Venturi tube controlling the communication, and wherein the said tube is mounted to slide in the main or inner casing and to be operated by the suction in the casing, and wherein the fuel is delivered within the Venturi tube and is controlled by the pressure in the inner casing.

A further object is to provide mechanism between the inner and the outer casing for constraining the preheated air to encircle and inclose the inner casing to move in close contact with the wall thereof, and wherein the said air is also constrained to move close to the fuel supply in order to heat the said supply.

In the drawings:—

Figure 1 is a vertical section through the improved carbureter, and

Fig. 2 is a section on the line 2—2 of Fig. 1, looking in the direction of the arrows adjacent to the line.

The present embodiment of my invention comprises an inner casing 1 of cylindrical form, and having its outer end enlarged annularly as shown at 1ª, and at the outer end of the enlarged portion the casing is again reduced, and is provided with laterally extending lugs 2, which have openings 3, for receiving bolts or the like, to connect the carbureter to the engine.

The inner casing is encircled by the outer casing 16, the said outer casing being concentric with the inner casing but spaced apart therefrom, and the outer casing is provided with a lateral inlet 17, which may be connected with a source of heated air, as for instance, the exhaust of the engine.

The casing 1 is open at its ends, and at its outer end the casing 16 is provided with a reëntrant portion 18, extending within the inner end of the inner casing, and the reëntrant portion joins the main portion of the outer casing on a curve or arc, as shown in Fig. 1.

A Venturi tube 8 is mounted to slide in the inner casing toward and from the connection between the reëntrant portion and the body of the outer casing, and the Venturi tube, as shown, is reduced internally intermediate its ends, and is gradually enlarged from the reduced portion toward each end. Thus the Venturi tube has at each end a frusto-conical bore, and the reëntrant portion 18 of the outer casing is tapered at the same angle as the frusto-conical or tapered portion at the lower end of the Venturi tube. The Venturi tube is provided with radial ports 9 at its lower end, and a valve casing 10 is arranged within the lower end of the inner casing at the reëntrant portion.

This valve casing is provided at its inner end with a fuel or aspirating well 11, of tapering form, and a passage leads from the well downwardly into the casing. The casing 10 is passed through an opening in the bottom of the fuel chamber, to be later described, which encircles the outer casing, and through the opening at the center of the reëntrant portion, and that portion of the casing inside the inner casing is frusto-conical, as shown, while that portion without the outer casing is cylindrical externally.

An annular shoulder is formed between the frusto-conical and the cylindrical portions, and this shoulder rests upon the inner end of the reëntrant portion. The frusto-conical portion of the valve casing is tapered at the same angle as the reëntrant portion, and the lower end of the valve casing is closed by a threaded plug 6, the plug being threaded into the lower end of the casing.

A guide 13 is arranged within the valve casing 10, and the lower end of the valve stem or needle valve 12 is connected with the guide. This guide is arranged to move longitudinally of the casing, to raise or lower the needle valve, and the said valve is adapted to close the passage between the fuel well and the valve casing. The guide is provided with an annular groove 14, which is for engagement by the operating mechanism to be later described, which operates the valve. It will be evident that when the Venturi tube is moved toward the engine, the space between the frusto-conical exterior of the valve casing and the reëntrant portion of the outer casing, and the tapering bore of the Venturi tube will be increased, to admit a larger amount of air. The tube is moved by the suction in the engine, under conditions to be later described, and when the tube is in the position shown in Fig. 1, the air which enters the inner casing must pass by way of the ports 9.

The Venturi tube has an annular external groove intermediate its ends, and a sleeve 5 encircles the tube in the groove. This sleeve is of less length than the groove, so that a limited sliding movement is permitted between the sleeve and the tube.

A disk 67 is connected to the sleeve by means of bars 68, and the disk, the sleeve and the bars constitute a cage and the cage is a throttle valve, which is moved upward by the suction, and which is moved downward by a cam or wiper 69 on the usual throttle valve shaft 70, which is journaled transversely of the inner casing. The cage is limited in its movement with respect to the Venturi tube by its engagement with the annular shoulders 65 and 66 formed at the ends of the groove of the said tube.

The inner surface of the jacket or outer casing is spaced apart from the outer surface of the inner casing to form an annular passage 20 between the said casing, from the inlet 17 downwardly to the lower end of the Venturi tube, and the ports 9 form a communication between the annular chamber 20 and the interior of the Venturi tube.

The valve and the stem 12 are adjusted by means of an eccentric 21, which is supported by a shaft 22 journaled transversely of the lower end of the valve casing 10 and outside the same, and the shaft is oscillated by means of a radial arm 23 secured thereto and extending below the carbureter. When the arm 23 is moved to oscillate the shaft, the eccentric moves therewith, and this eccentric fits within a ring or strap 24 which is interposed in the length of a lever 25. One end of the lever extends through a longitudinal slot 26 in the wall of the valve casing 10 and into engagement with the groove 14 of the guide 13, and the other or outer end of the lever 25 is connected to the lower end of a threaded rod 28—28ª by means of a link 27.

This rod 28—28ª is a piston rod and is composed of upper and lower sections which are connected together by an internally threaded sleeve or nut 29. The adjacent ends of the sections 28 and 28ª are threaded to engage the nut and the lower end of the lower section 28 is connected to the lever 25 by means of the link 27. The upper end of the section 28 of the piston rod is threaded through the connecting sleeve 30 of a doubleheaded piston, the said piston consisting of oppositely arranged heads 31 and 32 which are integrally connected by the sleeve 30 and the rod section 28ª is threaded entirely through the sleeve. This piston moves in a cylinder 33 which is arranged outside of the outer casing 16 at the opposite side from the air inlet 17 and the said cylinder 33 has oppositely extending flanges 34 which fit against the outer face of the casing 16 and are secured thereto in any suitable manner.

The upper end of the cylinder is normally closed by a head 35, and the lower end is closed by a plug or head 36, and the said lower head has a central hub or nipple through which the upper section 28ª of the piston rod extends. The cylinder 33 is connected to the interior of the casing 1 by upper and lower passages 37 and 38, the said passages extending transversely of the annular chamber 20.

The feed chamber for the carbureter indicated at 39 is in the form of a cup arranged at the lower end of the outer casing and inclosing said lower end. This cup has a central opening in its bottom through which the casing 10 extends, and a float 40 is arranged within the chamber near the top thereof, the said float being in the form of a hollow ring which encircles the outer casing or jacket 16. The float is hinged at one side to the top of the cup or chamber 39 as indicated at 41, and valves 42 and 43 are connected with the float at the opposite side from the hinge.

These valves 42 and 43 are connected to the ends of a spring plate 44, which is connected intermediate its ends to the top of the float 40. Both valves are conical in form and each valve coöperates with a similarly shaped port in the top or cover of the chamber 39. The valve 43 which is the air valve coöperates with a port or passage 45 and the valve 42 which is the fuel valve coöperates with the port 46. The port 46 opens directly into the main float chamber 47, which is arranged between the inlet 17 and the chamber 39, at the opposite side of the casing from the cylinder 33, and the port 45 opens near the top of this chamber, by means of a pipe 48 which is connected with the port and extends to near the top of the chamber.

The main float 49 is arranged within the chamber 47 and at the top of the float is arranged the conical or tapering valve 50, which coöperates with a port in the head 51 of the said chamber, this head being threaded into the top of the chamber. A spring 52 is connected with the interior of the chamber 47 at the upper end thereof, and the lower end of the spring has an angular portion 53 which limits the downward movement of the float 49. The spring and the float are provided with interengaging projections, as shown in Fig. 1, for holding the float lifted or lowered, and the tension of the spring is controlled by a set screw 54 which is threaded through the wall of the chamber 47 into engagement with the spring.

The main fuel supply pipe 55 is connected with the top or cover 51 of the chamber 47, and a check valve 56 is arranged within the pipe 55, for preventing the return of the fuel through the pipe. In operation the preheating air entering by way of the air inlet 17 is constrained to pass around the inner casing 1 between the same and the outer casing 16 and in close contact with the wall of the inner casing. A ring 57 is arranged between the inner and the outer casings just below the inlet 17 and this ring is eccentrically bored, as shown, more particularly in Fig. 1.

The greatest space between the interior of the ring and the exterior of the casing 1 is at the opposite side from the inlet 17. The hot air is thus constrained to move close to the outer surface of the inner casing at the side adjacent to the inlet 17, and this preheated air is constrained to pass around the inner casing by the ring, since it is obvious that the greater amount of the air can pass adjacent to the ports 37 and 38 because of the fact that the passage is greater at the opposite side from the inlet 17 than adjacent to the inlet. The inner tube or casing 1 will thus be heated at and above the throttle 67 after which the hot air will pass down to heat the main fuel chamber 39, and it will be noted from an inspection of Fig. 1 that the inner wall of this chamber, that is, the outer casing 16 is made thin in order to assist in the heating. After heating the fuel chamber 39 the hot air may pass through the ports 9 and into the bottom of the Venturi tube.

It will be noted that the Venturi tube is supported only by its engagement with the connection between the reëntrant portion 18 and the body of the jacket or outer casing 16 so that when the suction is sufficiently great in the inner casing 1, the said tube may lift to admit a greater amount of air. All of the air that passes through the Venturi tube must be heated as it must pass by way of the ports 9, while at high speed the Venturi tube may lift from its seat to admit an extra charge at the base, the volume admitted being guided by the extent to which the Venturi tube rises.

When the piston of the cylinder moves in a direction to exhaust the air from the inner casing 1 the air rushes in through the air inlet 17 to take the place of the air withdrawn. The ring 57, however, forms an obstruction for preventing the free entrance of air to the Venturi tube and thus a partial vacuum will be formed which will retard the lift of the said tube in its sleeve.

This obstructing ring or baffle modifies the action of the sliding Venturi tube in its sleeve and prevents the mixture from becoming too poor when the point of greatest resistance to the air in the Venturi tube is above the mouth of the aspirating well, as is the case when the maximum lift has been attained. This baffle plate or obstructing ring 57 also prevents the entire volume of inrushing air from being drawn down on one side of the inner casing, thus insuring uniform heating of the inner casing.

It will be noticed from an inspection of Fig. 1 that the head or valve of the stem 12 is tapering or frusto-conical, and this valve regulates the flow of the fuel into the aspirating well. This valve is regulated by the eccentric 21, and the said valve is controlled by the double headed piston. It will be noted that the passages 37 and 38 which connect the cylinder 33 with the inner or main casing 1 open above and below the throttle valve 6.

It will also be noted that the passage 38 is in position to be closed or partially closed by the Venturi tube when this tube lifts sufficiently. When the throttle is partly closed or when the Venturi tube is lifted high enough to cover the mouth of the passage 38 the suction in the cylinder of the engine will be transmitted by the port 37 to the upper end of the cylinder 33 and as a consequence the double headed piston will move upward, and the valve 12 which is a metering or measuring valve will be lowered to cut off the supply of fuel. A port or passage 58 is also provided connecting the cylinder 33 with the annular chamber 20, the said passage or port being between the passages 37 and 38 and opening into the cylinder between the heads 31 and 32 of the piston. This port may if desired open directly into the atmosphere instead of into the chamber 20, and it will be noted that the wall of the cylinder 33 is ported or cut away below the port 37 as indicated at 59 so that when the piston moves upward the upper head 31 will uncover the lower end of this port or passage.

When the pressure at the upper end of the cylinder 33 is lowered sufficiently to cause the double headed piston to rise, this port or passage 59 in the cylinder wall is uncovered, permitting air to pass by way of the ports 58, 59 and 37 to that part of the main casing above the throttle valve.

The improved carbureter has a main float chamber 47 and a secondary float chamber 39, and the action of the float 40 in the secondary chamber is entirely free, the float rising and falling with the changes in the fuel level. The action of the float 49, however, is retarded by the spring 52 which presses against the side of the float and whose pressure may be regulated by means of the set screw 54.

When the float 49 is in lifted position the interengaging projections on the spring and the float prevent the float 49 from falling until there has been a noticeable or relatively considerable change in the level of the fuel. When the float is lowered the interengagement of the projections prevents lifting of the float until there is a considerable, or at least an appreciable, change in the fuel level. Whenever the pressure in the main casing 1 is lowered, this pressure is transmitted by way of a pipe 60 to a point directly above the port with which the valve 50 coöperates and to the main float chamber 47 where the pressure is transmitted to the pipe 55, and to the check valve 56 therein, lifting the said check valve and causing an increased flow of fuel to the main float chamber. When the float chamber 47 is filled to its maximum capacity the float is released, and rising the float closes the valve 50, while the check valve 56 prevents the fuel in the pipe line 55 from flowing back to the supply tank.

The carbureter has two valves in the secondary chamber, namely:—the air valve 43 and the fuel valve 42, which control the communication between the said secondary chamber and the primary chamber and one valve 42 opens directly into the main float chamber. The other, however, opens near the top of the chamber by means of the stand pipe 48, and this pipe opens at a point above the maximum fuel level of the main chamber. When the valve 43 is open the valve 42 will also be open, thus permitting the pressure in the two chambers to equalize itself. The air at the top of the chamber 39 will flow into the top of the chamber 47, while the liquid fuel will flow from the bottom of the chamber 47 directly into the chamber 39. Thus the fuel may gravitate naturally into the secondary chamber.

In use when a partial vacuum is created in the upper end of the main casing 1, the preheated air will pass in by way of the air inlet 17 to the annular chamber 20, and the baffle ring 57 will constrain this air to surround the inner casing in a uniform manner and to pass down in close contact with the outer surface of the said casing to the bottom of the annular chamber 20. The air will also heat the wall 16 of the jacket or outer casing, the said wall being thin and the heat will be transmitted to the fuel in the secondary fuel chamber 39. The air will pass through the ports 9 under ordinary conditions, that is, with light load or the Venturi tube 8 will be lifted to permit air to pass up between the lower end of the said tube and the reëntrant portion 18 of the outer casing.

Whenever the tube 8 is lifted, it will be obvious that the space between the tapering exterior of the reëntrant portion and the valve casing and the inner surface of the Venturi tube will increase rapidly, the maximum capacity of this space being obtained when the throttle is open and the Venturi tube is in its highest position with respect to the cage constituted by the ring 5 and the bars 68, that is, when the shoulder 66 is in contact with the lower end of the stop ring 5 and with the throttle in its highest position. It will be noted that the exterior of the reëntrant portion 18 of the outer casing is tapering and that the exterior of the said portion makes a uniform surface with the frusto-conical external portion of the valve casing.

The fuel passes from the secondary chamber 39 into the valve casing 10 by way of the ports 10$^a$, one of which is shown, and up past the valve 12 to the aspirating well 11. As the air passes over the aspirating well a portion of the fuel will be vaporized and will pass up with the air past the throttle valve to the engine. All of the air that enters the inner casing must pass over the aspirating well and must pass through the Venturi tube. The said tube being freely slidable within the inner casing will be very sensitive to change the condition in the said casing and the ports 9 under ordinary conditions, that is, at low speed and with light load will be sufficient to admit the air required.

When, however, the low pressure in the inner casing 1 is such that the Venturi tube will be lifted an extra large amount of air may pass up through the tube and over the aspirating well, this amount depending upon the amount of the suction, that is, upon the height to which the Venturi tube is lifted. This height may be varied by adjusting the ring 5 by means of the cam 69.

The baffle or obstructing ring 57 acts to assist in producing a partial vacuum in that part of the annular chamber 20 below the said baffle when a predetermined suction is exerted by the engine in the inner casing 1, and the said ring thus modifies the action of the Venturi tube, insuring a mixture of sufficient richness, whatever conditions may be. It will be evident that when the Venturi tube is at its highest point, the point of greatest resistance to the action of the air in the Venturi tube will be above the aspirating well. The amount of fuel supplied to the aspirating well is regulated by the valve 12, and this valve is controlled by the piston 31—32.

When the suction above the throttle valve is such as to reduce the pressure in the upper end of the chamber 33 below that in the lower end of the chamber, it is obvious that the piston will move upward, thus moving the valve downward and partially closing the same. The position of the valve 12 may be regulated by the eccentric 21 which is controlled by the radial arm 23.

The float 49 is also hinged at the opposite side from the valve 50, as indicated at 61, to the top 51 of the chamber 47, and the portion 28 of the rod 28—28ª passes through a tubular guide and shield 62 in the chamber 47.

It will be evident that the throttle valve and the cage connected therewith, including the sleeve 5, will always tend to rise, because of the reduced pressure above the throttle valve, and hence the head 67 or throttle valve will always rise against the cam. When the throttle valve moves upward, as soon as the upper end of the sleeve 5 engages the shoulder 65, the Venturi tube will also be lifted, but until this time the air entering must pass by way of the ports 9.

When the throttle is wide open, but with the engine turning slowly, the top of the Venturi tube is just below the port 38. When the depression becomes great enough, as will be the case when the engine is racing with the throttle open, the Venturi tube will rise from its seat in the cage and will cover the port 38, thus causing the piston to rise in its cylinder. With this construction a long Venturi tube may be used, so that the expansion of the explosive mixture after having passed the most contracted part may be more gradual. In addition a larger orifice is permitted for the Venturi tube, thus reducing the degree of vacuum.

I claim:

1. A carbureter comprising inner and outer casings spaced apart from each other, the inner casing having its ends open, and the outer casing having a reëntrant portion of tapering form extending into the inner end of the inner casing, a sliding controlling tube mounted in the inner casing and having a tapering bore coöperating with the reëntrant portion, said reëntrant portion having an aspirating well within the controlling tube and said tube having radial ports at its inner end, a valve controlling the fuel supply to the aspirating well, a lever for moving the valve, an oscillating eccentric upon which the lever is pivoted intermediate its ends, said eccentric having means for oscillating the same to adjust the valve, a throttle valve within the inner casing and intermediate the ends thereof, and means controlled by the difference in pressure on the opposite sides of the said throttle valve for controlling the inlet valve.

2. A carbureter, comprising inner and outer casings spaced apart from each other to form an annular passage between said casings, the inner casing having its ends open and the outer casing having a reëntrant portion of tapering form extending into the inner end of the inner casing and supporting an aspirating well for the fuel, said outer casing having a lateral inlet at the opposite end, a sliding controlling tube mounted in the inner casing and having a tapering bore coöperating with the reëntrant portion and having radial ports at the inner end of the tube, and a baffle ring arranged between the casings and having its opening eccentric to the inner casing and arranged to constrain the greater portion of the entering air to pass to the opposite side of the inner casing from the inlet.

3. A carbureter, comprising inner and outer casings spaced apart from each other to form an annular passage between said casings, the inner casing having its ends open and the outer casing having a reëntrant portion of tapering form extending into the inner end of the inner casing and supporting an aspirating well for the fuel, said outer casing having a lateral inlet at the opposite end, a sliding controlling tube mounted in the inner casing and having a tapering bore coöperating with the reëntrant portion and having radial ports at the inner end of the tube, and means between the casings for constraining the entering air to be distributed uniformly about the inner casing and in close contact with the wall thereof.

4. A carbureter comprising inner and outer casings spaced apart from each other, the inner casing having open ends and the outer casing having a tapering valve casing extending into the inner end of the inner casing and provided with a fuel well, a sliding controlling tube having a tapering bore coöperating with the valve casing and mounted to slide within the inner casing, said tube having radial ports at its inner end, a valve in the valve casing for controlling the flow of fuel to the well, means for operating the valve, a throttle valve in the inner casing, and means controlled by the difference in pressure on opposite sides of the valve for controlling the valve operating means.

5. A carbureter comprising inner and outer casings spaced apart from each other, the inner casing having open ends, and the outer casing having a tapering valve casing extending into the inner end of the inner casing and provided with a fuel well, a valve in the casing for controlling the supply of fuel to the well, a tubular valve having a tapering bore mounted to slide within the inner casing and coöperating with the valve casing, the said tube having radial ports at its inner end, a throttle valve in the inner casing, the outer casing having a lateral port at the opposite end from the fuel well, and means within the space between the casings for obstructing the free flow of air from the inlet to the inner casing, said means comprising a ring having an eccentric opening through which the said casing extends, the inner casing being nearest the ring at the inlet.

6. A carbureter comprising inner and outer casings spaced apart from each other, the inner casing having open ends and the outer casing having a tapering valve casing extending into the inner end of the inner casing and provided with a fuel well, a valve in the casing for controlling the supply of fuel to the well, a tubular valve having a tapering bore mounted to slide within the inner casing and coöperating with the valve casing, the said tube having radial ports at its inner end, a throttle valve in the inner casing, the outer casing having a lateral port at the opposite end from the fuel well, and means within the space between the casings for obstructing the free flow of air from the inlet to the inner casing.

7. A carbureter comprising inner and outer casings spaced apart from each other, the inner casing having open ends and the outer casing having a tapering valve casing extending into the inner end of the inner casing and provided with a fuel well, a tubular valve having a tapering bore mounted to slide within the inner casing and coöperating with the valve casing, the said tube having radial ports at its inner end, a valve in the valve casing for controlling the flow of fuel to the fuel well, and means for adjusting the valve, said means comprising a lever, an eccentric journaled intermediate the ends of the lever and having means for oscillating the same, the lever having a bearing engaging the eccentric.

8. A carbureter having a fuel well at its outer end and an annular air inlet encircling the well, a valve comprising a tubular portion fitting the carbureter and slidable therein and adapted to close the annular air inlet when in its outermost position, and a disk connected to the tubular portion and adapted to close the carbureter casing when the valve is in its outermost position, said well being tapered externally and the tubular portion of the valve being tapered to fit the well, and the disk having a limited sliding movement with respect to the tubular portion.

9. A carbureter having a fuel well at its outer end and an annular air inlet encircling the well, a valve comprising a tubular portion fitting the carbureter and slidable therein and adapted to close the annular air inlet when in its outermost position, and a disk slidably connected to the tubular portion and adapted to close the carbureter casing when the valve is in its outermost position.

10. A carbureter comprising inner and outer casings spaced apart from each other, the inner casing having open ends, and the outer casing having a valve casing extending into the inner end of the inner casing and provided with a fuel well, a tubular valve having a tapering bore mounted to slide within the inner casing, and coöperating with the valve casing, the said valve having radial ports at its inner ends, means for limiting the movement of the valve, a throttle valve arranged transversely of the inner casing and partially closing the same, and connected with the limiting means for the valve, and a cam for moving the said valve downward, said inner casing having an annular enlargement at the throttle valve and coöperating therewith for increasing the capacity of the space between the throttle valve and the inner casing when the valve moves upward.

11. A carbureter comprising inner and outer casings spaced apart from each other, the inner casing having open ends, and the outer casing having a valve casing extending into the inner end of the inner casing and provided with a fuel well, a tubular valve having a tapering bore mounted to slide within the inner casing and coöperating with the valve casing, said valve having radial ports at its inner ends, means for limiting the movement of the valve, a throttle valve, and a connection between the said throttle valve and the limiting means for lifting the same when the throttle valve opens to permit a greater lifting movement of the valve.

12. A carbureter comprising inner and outer casings spaced apart from each other, the inner casing having open ends, and the outer casing having a valve casing extending into the inner end of the inner casing and provided with a fuel well, a tubular valve having a tapering bore mounted to slide within the inner casing and coöperating with the valve casing, the said valve having radial ports at its inner ends, means for limiting the movement of the valve, and means operated by the suction for moving the limiting means upward to permit a greater lifting movement of the valve, and means for restraining the operation of the said suction controlled means.

13. A carbureter comprising inner and outer casings spaced apart from each other, the inner casing having open ends, and the outer casing having a valve casing extending into the inner end of the inner casing and provided with a fuel well, a tubular valve mounted to slide within the inner casing and coöperating with the valve casing, the said valve having radial ports at its inner ends, means for limiting the movement of the valve, and means operated by the suction for moving the limiting means upward to permit a greater lifting movement of the valve.

14. A carbureter comprising inner and outer casings spaced apart from each other, the inner casing having open ends, and the outer casing having a valve casing extending into the inner end of the inner casing and provided with a fuel well, a tubular valve mounted to slide within the inner casing and coöperating with the valve casing, the said valve having radial ports at its inner ends, a throttle valve, and means controlled by the throttle valve for limiting the rising and falling movement of the valve.

15. A carbureter comprising inner and outer casings spaced apart from each other, the inner casing having open ends and the outer casing having a valve casing extending into the inner end of the inner casing and provided with a fuel well, a sliding controlling tube having a tapering bore coöperating with the valve casing and mounted to slide within the inner casing, said tube having radial ports at its inner end, a valve in the valve casing for controlling the flow of fuel to the well, means for operating the valve, a throttle valve in the inner casing, and means controlled by the difference in pressure on opposite sides of the valve for controlling the valve operating means.

16. A carbureter comprising inner and outer casings spaced apart from each other, the inner casing having open ends, and the outer casing having a valve casing extending into the inner end of the inner casing and provided with a fuel well, a tubular valve mounted to slide within the inner casing and coöperating with the valve casing, the said valve having radial ports at its inner end, a throttle valve in the inner casing, the outer casing having a lateral port at the opposite end from the fuel well, and means within the space between the casings for obstructing the free flow of air from the inlet to the inner casing, said means comprising a ring having an eccentric opening through which the said casing extends, the inner casing being nearest the ring at the inlet.

17. A carbureter comprising inner and outer casings spaced apart from each other, the inner casing having open ends and the outer casing having a valve casing extending into the inner end of the inner casing and provided with a fuel well, a tubular valve mounted to slide within the inner casing and coöperating with the valve casing, the said valve having radial ports at its inner end, a throttle valve in the inner casing, the outer casing having a lateral port at the opposite end from the fuel well, and means within the space between the casings for obstructing the free flow of air from the inlet to the inner casing.

18. A carbureter comprising inner and outer casings spaced apart from each other, the inner casing having open ends and the outer casing having a valve casing extending into the inner end of the inner casing and provided with a fuel well, a tubular valve mounted to slide within the inner casing and coöperating with the valve casing, the said valve having radial ports at its inner end, a valve for controlling the flow of fuel to the fuel well, and means for adjusting the valve, said means comprising a lever, an eccentric journaled intermediate the ends of the lever and having means for oscillating the same, the lever having a bearing engaging the eccentric.

19. A carbureter comprising a tubular casing having a fuel well at its outer end, an annular air inlet at the well, a tubular valve fitting the casing and slidable therein, and adapted to close the annular air inlet when in its outermost position, and a disk connected to the valve and adapted to close the carbureter casing when the valve is in its outermost position, said carbureter casing being enlarged on the inner side of the disk, said disk and tubular portion having a limited relative movement with respect to each other, and means for moving the valve toward the well.

20. A carbureter comprising a tubular casing having a fuel well at its outer end, an annular air inlet at the well, a tubular valve fitting the casing and slidable therein, and adapted to close the annular air inlet when in its outermost position, and a disk connected to the valve and adapted to close the carbureter casing when the valve is in its outermost position, said carbureter casing being enlarged on the inner side of the disk, said disk and tubular portion having a limited relative movement with respect to each other.

21. A carbureter, comprising an inner casing and an outer casing spaced apart therefrom, the inner casing having open ends, and the outer casing having a reëntrant portion at the inner end of the inner casing and provided with an aspirating well at its apex, a controlling tube mounted to slide in the inner casing toward and from the reëntrant portion and having a tapering bore coöperating with the said portion, said tube having radial ports at its lower end, a throttle valve arranged above the sliding tube, a main fuel supply chamber delivering to the well, and a valve for controlling the supply of fuel to the well, and a throttle valve in the casing between the controlling tube and the engine, and means controlled by the difference in pressure on opposite sides of the throttle valve for controlling the said fuel supply valve.

CHAUNCEY MORGAN.

Witnesses:
Wm. Lee,
H. N. Wolfe.